INVENTORS
WILLIAM C. MORGAN
JACK B. ESGAR
RICHARD H. KEMP
BY
ATTORNEYS

INVENTORS
WILLIAM C. MORGAN
JACK B. ESGAR
RICHARD H. KEMP

ATTORNEYS

United States Patent Office 3,326,407
Patented June 20, 1967

3,326,407
THIN-WALLED PRESSURE VESSEL
William C. Morgan, Westlake, Jack B. Esgar, North Olmsted, and Richard H. Kemp, Westlake, Ohio, assignors to the United States of America as represented by the Administrator of the National Aeronautics and Space Administration
Continuation of application Ser. No. 284,760, May 31, 1963. This application Apr. 13, 1965, Ser. No. 447,928
3 Claims. (Cl. 220—67)

The invention described herein may be manufactured and used by or for the Government of the United States of America for governmental purposes without the payment of any royalties thereon or therefor.

The present invention relates, generally, to pressure retaining vessels, and more particularly, to a thin-walled cryogenic test vessel.

This application is a continuation of copending application Ser. No. 284,760 which was filed May 31, 1963 and now abandoned. As pointed out in this copending application, chemical, atomic and electro-thermal rockets customarily utilize as one of their propellants, a cryogenic fluid or gas. Since the weight of these propulsion systems is of primary importance, storage vessels and other pressure retaining shells for the cryogenic propellants, are designed to operate at or near the yield stress of the materials from which they are formed. Heretofore, theoretical procedures have been utilized for vessel design. However, because of the increasing use of cryogenic liquids in rocket engines, it is desired that tests be made to substantiate previously published theoretical procedures for the prediction of stress distribution. Therefore, a test is required to determine the distribution and qualitative significance of stresses attributable to the presence of changes in wall thickness, typical of shell design practice.

Because of the low temperature range (70° F.–452° F.) and the high pressures (up to 2000 p.s.i.) at which the tests are required to be conducted, the utilization of conventional pressure vessels as test vehicles is impractical. Clamped or flanged fittings with gaskets or O-rings required both heavy and expensive flanges, and provide unreliable seals and undesirable loading on the test vessel at cryogenic temperature. Fabrication of the vessels by welding the head and shell imparts extraneous stresses to the test shell, and also involves great expense because of the difficulty of fabrication and the fact that the entire test vessel is good for only one test run.

According to the present invention, there is provided a novel pressure test vessel in which the shell is attached to the heads by a specially configured alloy-filled joint. The low-melting alloy, upon solidification, slightly expands to bear against the sides of the joint and form a pressure tight seal; thereafter, the coefficient of expansion of the low-melting alloy closely matches the coefficient of expansion of the base material of the head so that further cooling of the test vessel causes no undesirable loading. Provision is also made for matching the coefficients of expansion of the heads and shell. This provides for the easy assembly and disassembly of the test vessel so that the heads may be utilized again.

It is, therefore, an object of the present invention to provide a test vessel upon which substantially no undesirable loading is imposed by fabrication.

Another object of the invention is to provide a connector for a cylinder and its heads which imposes substantially no stresses on the shell forming the cylinder.

Still another object of this invention is to provide a low-melting alloy joint which forms an effective pressure seal at cryogenic temperatures.

It is yet another object of this invention to provide a pressure retaining vessel, the heads of which may be easily disassembled and reassembled with a new test shell.

Other objects and advantages will be apparent from the detailed description which follows and from the drawings wherein like numerals are used to identify like parts.

Figure 1:
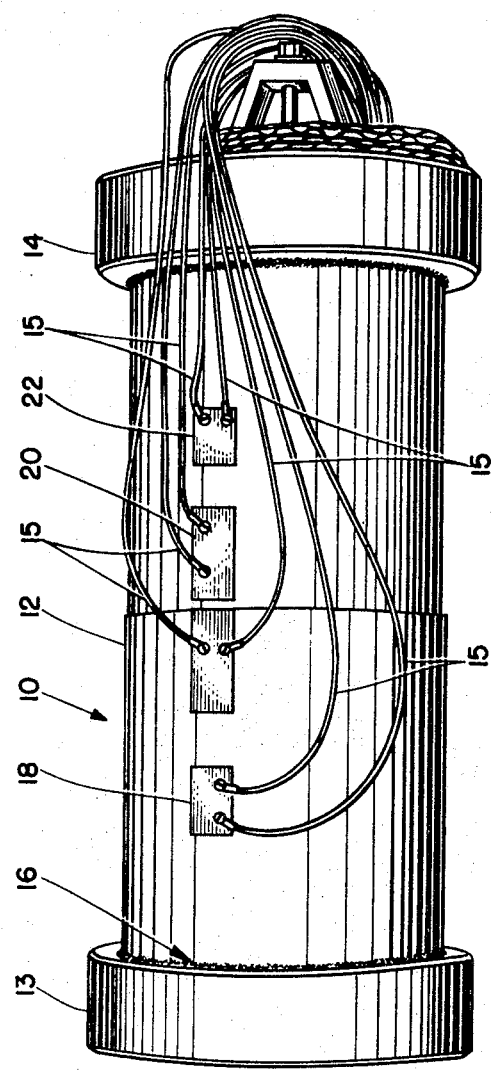
FIG. 1 is a view in elevation of the test facility of which the invention is a part.

Referring now to the drawings, there is shown in FIG. 1, a pressure vessel 10 having a cylindrical shell 12 which extends between and is fixedly attached to a pair of heads 13, 14. A suitable hydraulic pressure supply means (not shown) is located adjacent to the head 13 to supply varying pressure to the test vessel, and several strain gauge lead wires 15 are conventionally affixed to the cylindrical shell generally at 19, 21, and 23 and extend therefrom to head 14, additional strain gauge lead wires 24 are connected to the interior surface of the shell 12 and extend outwardly through the head 14.

Each of the heads 13, 14 is attached to the shell 12 by a contoured joint 16 (FIG. 2) filled with a low-melting alloy 17 which has the characteristic of slight expansion upon solidification to thereby form a tight pressure seal between the shell and the head. The contour of joint 16 is formed by milling a pair of oppositely facing annular grooves 18 and 20 for the receipt of the alloy in shell 12 and an annular groove 22 in head 14 to provide for both, the receipt, the low-melting alloy and the insertion of the shell in the head. The shell grooves 18 and 20 are formed with indented portions 24 and 26 for lodgement of the alloy material and upper and lower fillets 28, 30, 32 and 34, respectively to eliminate sharp corners and insure a continuous joint from which all pockets are eliminated. Head groove 22 is formed with upwardly converging sides 36 and 38 which provide a re-entrant angle placing a large portion of the alloy joint in shear, the lower end of the sides 36 and 38 terminate in inwardly turned fillets 40 and 42 below which the alignment section 44 of the joint 16 is formed by vertical sides 46, 47 and a bottom 48.

The pressure vessel is assembled by placing the shell 12 and head 14 in a vertical position filling the head groove 20 with alloy 17 and heating the head to above the melting point of the alloy, the shell is then inserted in the groove 20 utilizing the alignment means 44 to center the shell. After solidification of alloy joint 16, in head 14, the annular groove in head 13 is filled with alloy and the other sealing joint 16 formed in a similar manner. A heat barrier (e.g. cooling coils) may be interposed intermediate te ends of the shell, if required, to prevent melting the already formed alloy joint 16 or the epoxy cement connecting means for the strain gauge lead wires.

A small lead wire plate 50 (FIG. 2) is provided in the head 14 for the passage of the lead wires 24, which are led through the plate by pipe fittings 52 sealed with packing material 54. Lead wire plate 50 is sealingly held against pressure leaks by O-ring 56, disposed in an annular cutout 58 formed in plate 50 and wedged against sloped sides 60 of circular cutout 58 of the head 14. Lead wire plate 50 is additionally provided with chamfer 62 to insure proper seating of its bottom surface 64 in cutout 58. Clamping assembly 66 comprised of integral clamping rings 68 and yoke 70 which bolt 71 threadingly engages lead wire plate 50 to bearingly hold the plate tightly against the head 14 without imparting any load to the shell 12.

Although the test vessel just described has good pressure holding characteristics with very limited "built in tresses," it has been found that nearly all extraneous stress may be eliminated from the shell by selecting a head material and brazing alloy which have closely matched coefficients of expansion. In the described embodiment, the head was of easily machineable aluminum so as to present approximately the same coefficient of expansion as the sealing alloy, and the low-melting alloy was one containing primarily bismuth and lead which provided the desirable properties of slight expansion upon solidification and a coefficient of expansion in solid state substantially similar to that of the aluminum head. A satisfactory alloy for this application is sold commercially and may be purchased under the trade name, "Cerromatrix," the composition of this alloy is:

|  | Percent |
|---|---|
| Bismuth | 48.0 |
| Lead | 28.5 |
| Tin | 14.5 |
| Antimony | 9.0 |

A further reduction in extraneous stresses in the test shell may be achieved if the coefficient of expansion of the test shell is also matched to the head. In practice, an aluminum shell was utilized with the aluminum head and "Cerromatrix" alloy and it was found that this resulted in the total elimination of undesirable loading on the shell.

Figures 2, 3:
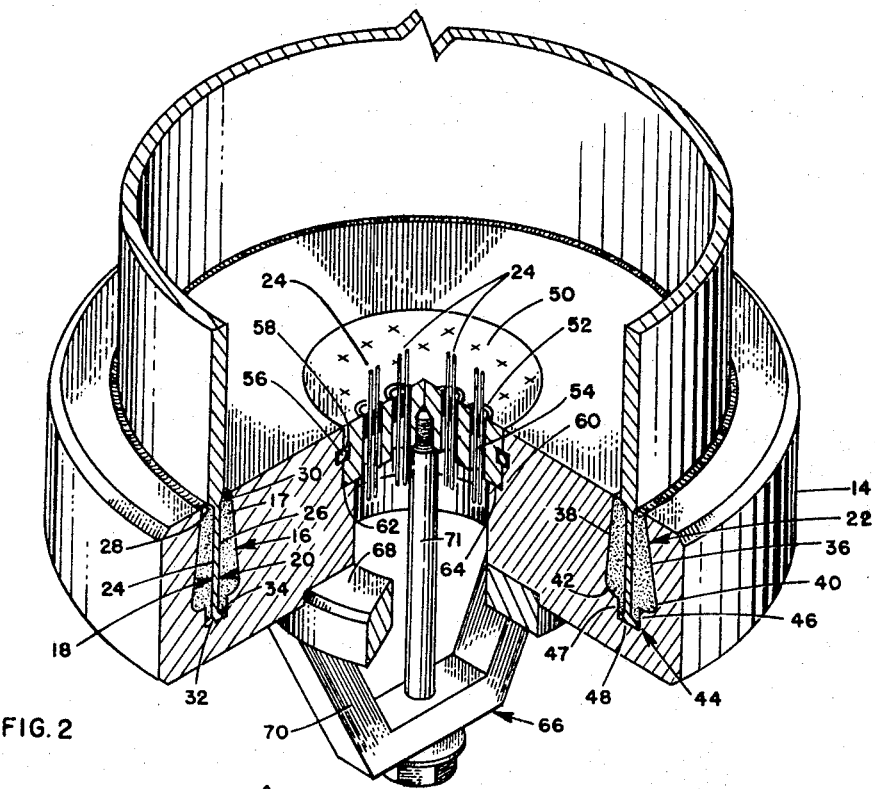
FIG. 2 is an enlarged perspective view, partly in section, of one end of the test cylinder.
FIG. 3 is a view similar to FIG. 2 but showing a modified form of the invention.

In the modified test vessel 70 shown in FIG. 3, easily machineable aluminum heads 72, 72 were again used, however for test purposes a test shell 76 of a dissimilar material was required; that is, data was required for shell materials such as titanium, austenitic and martensitic steels. So as to eliminate all undesirable loading in the test shell 76 of this embodiment of the invention, the entire vessel was given an overall matching coefficient of expansion. To this end, the aluminum heads 72 were provided with suitably shaped matching inserts 78, made for example of Inconel, the inserts being disposed in the heads by a light shrink fit to thereby provide the heads 72 with an equivalent coefficient of expansion which closely matches the coefficient of the shell material.

After the inserts have been shrunk fit in the heads 72, the test vessel 70, provided with a joint 71 which is similar to the joint 16 of the first embodiment, is assembled in the same manner as the test vessel illustrated in FIG. 2. Interior strain gauge lead wires 82 are connected to the vessel 70 in a conventional manner and the wires 82 are led through a plate 73 in the head 74 by pipe fittings 86 filled with packing material 88 to place the vessel in condition for test.

Certain embodiments of the invention have been shown and particularly described for the purposes of explaining the principles of operation of the invention and showing its application, but it will be obvious to those skilled in the art that many modifications and variations are possible and it is intended, therefore, to cover all such modifications and variations as fall within the scope of the invention.

We claim:

1. A joint comprising in combination first and second telescoping members, said first member having first and second parallel surfaces and including first and second parallel back-to-back grooves in said first and second surfaces, respectively, adjacent and parallelling one end of said first member, each of said grooves in cross section being filleted at the junctures of the bottoms and sides thereof, the grooved portion of said first member being telescopically received in a groove provided in the second member, said second member groove in cross section having a bottom portion with upwardly directed parallel side walls, said bottom portion being substantially equal in width to the thickness of said first member to provide alignment means therefor, the open end of said second member groove being substantially wider than the thickness of said first member, the portion of said second member groove between said open end and said bottom portion having side walls mutually diverging in the direction of the groove bottom and terminating in respective fillets merging with the sidewalls of said bottom portion, and an expansible-on-solidification low-melting alloy disposed in the joint formed by the first and second member, said alloy in its solid state compressively bearing on the sides of the first and second members thereby providing a pressure-type seal.

2. A test vessel comprising a tubular shell and an end closure closing an end of said shell, said shell having adjacent and parallelling its closed end an outwardly opening filleted groove in its outer face and an inwardly opening filleted groove in its inner face, said end closure being provided with a groove in one of its faces in which groove the grooved portion of the shell is disposed, the side walls of said end closure groove converging toward each other in the direction of the opening of the end closure groove and at their inner edges merging with transverse walls which extend toward the center of said closure groove, said transverse walls terminating in depending parallel walls which in turn terminate in a flat bottom, said parallel walls being spaced from each other a distance substantially equal to the thickness of the tubular shell wall, the depending walls and bottom providing an alignment means for the grooved portion of the shell, and a low-melting expansible-on-solidifying alloy disposed in the grooves of said shell and end closure, compressively bearing on the sides of the shell and end closure grooves to thereby provide a pressure tight seal.

3. The test vessel of claim 2 in which a lead wire plate is disposed in an aperture in said end closure and, a compensating ring is disposed in a groove in said end closure about said lead wire plate.

References Cited

UNITED STATES PATENTS

| 310,049 | 12/1884 | Granger | 285—284 XR |
| 332,754 | 12/1885 | Scott | 285—287 XR |
| 814,753 | 3/1906 | Wallace | 220—67 |
| 2,527,908 | 10/1950 | Blitz | 220—45 XR |
| 2,780,386 | 2/1957 | Evans | 220—45 |
| 2,951,613 | 9/1960 | Hardigg | 220—81 |
| 3,063,594 | 11/1962 | Gerard et al. | 220—55 |

OTHER REFERENCES

"Low Melting Alloys," author W. C. Smith, found in "Metals Hand Book," edt. 1948, pp. 744–745.

THERON E. CONDON, *Primary Examiner.*

R. A. JENSEN, J. R. GARRETT, *Assistant Examiners.*